United States Patent
Seguin et al.

(10) Patent No.: US 7,046,709 B2
(45) Date of Patent: May 16, 2006

(54) $CO_2$ WAVEGUIDE LASER WITH BERYLLIUM OXIDE WAVEGUIDES

(75) Inventors: Vernon Seguin, Windsor, CT (US); Leon Newman, Glastonbury, CT (US); John Kennedy, Granby, CT (US)

(73) Assignee: Coherent, Inc., Santa Clara, CA (US)

( * ) Notice: Subject to any disclaimer, the term of this patent is extended or adjusted under 35 U.S.C. 154(b) by 254 days.

(21) Appl. No.: 10/716,001

(22) Filed: Nov. 18, 2003

(65) Prior Publication Data

US 2005/0105581 A1 May 19, 2005

(51) Int. Cl.
*H01S 3/03* (2006.01)

(52) U.S. Cl. ............................................. 372/64; 372/55

(58) Field of Classification Search .................. 372/64, 372/55, 99, 107

See application file for complete search history.

(56) References Cited

U.S. PATENT DOCUMENTS

| | | | | |
|---|---|---|---|---|
| 4,241,319 A | * | 12/1980 | Papayoanou | 372/68 |
| 4,373,202 A | | 2/1983 | Laakmann et al. | 372/64 |
| 4,493,087 A | | 1/1985 | Laakman et al. | 372/64 |
| 4,807,233 A | * | 2/1989 | Hart et al. | 372/18 |
| 4,807,234 A | * | 2/1989 | Hart et al. | 372/18 |
| 5,353,293 A | | 10/1994 | Shull | 372/34 |
| 5,610,936 A | | 3/1997 | Cantoni | 372/93 |
| 5,854,806 A | * | 12/1998 | Sutter | 372/82 |

(Continued)

FOREIGN PATENT DOCUMENTS

WO    WO 01/86767 A1    11/2001

OTHER PUBLICATIONS

A.E. Belyanko et al., "Waveguide $CO_2$ laser with 7.5 W output power," *Soviet Journal of Quantum Electronics*, vol. 14, No. 1, Jan. 1984, pp. 123-126.

J.L. Lachambre et al., "A transversely rf-excited $CO_2$ waveguide laser", *Appl. Phys. Lett.*, vol. 32, No. 10, May 15, 1978, pp. 652-653.

R.L. Abrams et al., "Characteristics of Sealed-Off Waveguide $CO_2$ Lasers", *IEEE Journal of Quantum Electronics*, vol. QE-9, No. 9, Sep. 1973, pp. 940-946.

M. Khelkhal et al., "Infrared optical constants of polycrystalline boron nitride", *Applied Optics*, vol. 32, No. 1, Jan. 1, 1993, pp. 57-59.

(Continued)

*Primary Examiner*—Minsun Harvey
*Assistant Examiner*—Tuan Nguyen
(74) *Attorney, Agent, or Firm*—Stallman & Pollock LLP (57) ABSTRACT

A pulsed, Q-switched, waveguide CO2 laser includes a plurality of waveguide channels formed in a block of a beryllium oxide ceramic material and is operated at a wavelength between about 9.2 and 9.7 micrometers. The laser has an output power up to 55% greater than that of a similarly configured laser, operated at the same wavelength and pulse conditions, but wherein the waveguide channels are formed in a block of an alumina ceramic material.

12 Claims, 5 Drawing Sheets

U.S. PATENT DOCUMENTS 6,788,722 B1 * 9/2004 Kennedy et al. .............. 372/64
2003/0156615 A1 * 8/2003 Kennedy et al. .............. 372/55

OTHER PUBLICATIONS

G.M. Carter et al., "A high-power $CO_2$ waveguide laser", *Appl. Phys. Lett.*, vol. 35, No. 2, Jul. 15, 1979, pp. 129-130.

D.R. Hall, "10-$\mu$m propagation losses in hollow dielectric waveguides", *Journal of Applied Physics*, vol. 48, No. 3, Mar. 1977, pp. 1212-1216.

K.D. Laakmann et al., "Waveguides: characteristic modes of hollow rectangular dielectric waveguides", *Applied Optics*, vol. 15, No. 5, May 1976, pp. 1334-1340.

* cited by examiner

CO₂ WAVEGUIDE LASER WITH BERYLLIUM OXIDE WAVEGUIDES

TECHNICAL FIELD OF THE INVENTION

The present invention relates generally to carbon dioxide ($CO_2$) lasers. The invention relates in particular to pulsed lasers emitting radiation at wavelengths between about 9.2 micrometers (μm) and about 9.7 μm.

DISCUSSION OF BACKGROUND ART

Waveguide $CO_2$ lasers are lasers in which lasing modes are constrained in zigzag arrangement of waveguide channels machined in a ceramic slab. Aluminum oxide (alumina—$Al_2O_3$) is the most commonly used ceramic material for the waveguide slab, for reasons including ease of machinability and a low cost relative to other machinable ceramics. The aluminum oxide ceramic slab is bounded by electrodes for exciting an RF discharge in a lasing gas in the waveguide channels. The RF discharge energizes the lasing gas for providing optical gain. A plurality of mirrors provides a folded laser resonator having a resonator axis extending through the zigzag arrangement of waveguides. Waveguide $CO_2$ lasers can be arranged to emit radiation at a wavelength within certain characteristic bands of wavelengths extending from about 9.2 μm to 10.8 μm. A particular laser wavelength is typically selected by the use of wavelength selective reflective coatings for the resonator mirrors. The most common $CO_2$ laser wavelength is 10.6 μm.

Wavelengths between about 9.2 μm and 9.7 μm are particularly useful for laser drilling in printed circuit board (PCB) materials. This is because these materials have a greater absorption for wavelengths in this wavelength range than for longer wavelengths. Unfortunately, the average power output for a pulsed waveguide $CO_2$ laser operating at a wavelength between about 9.2 μm and 9.7 μm is significantly less than for the same laser operating at 10.6 μm. By way of example, a Coherent-DEOS™ model LC-40 operating in a continuous wave (CW) mode at wavelength of 10.6 μm is capable of delivering an average power of about 40 Watts (W). The same laser operating at a wavelength of about 9.7 μm is capable of delivering only about 3 W. There is a need for increased average power output for waveguide $CO_2$ lasers operating at wavelengths between about 9.2 μm and 9.7 μm.

SUMMARY OF THE INVENTION

In one aspect, a laser in accordance with the present invention comprises a waveguide block of a beryllium oxide (beryllia—BeO) ceramic material. The waveguide block has at least one waveguide channel formed therein. A lasing gas including carbon dioxide is included within the waveguide channel. A laser resonator has a resonator axis extending through the waveguide channel. The waveguide block is located between electrodes arranged to energize the lasing gas such that laser radiation is generated in the laser resonator. The laser radiation has a wavelength between about 9.2 μm and 9.7 μm.

A preferred embodiment of the inventive laser includes seven waveguide channels arranged in a zigzag pattern. The resonator is folded by a plurality of mirrors such that the resonator axis extends through the waveguide channels. The laser includes a Q-switch arrangement and is operated to deliver the laser radiation as repeated bursts of Q-switched pulses. In an example wherein the laser is operated to deliver repeated bursts of 3 pulses of 9.27 μm, with individual pulses in the bursts having a pulse repetition frequency of about 60 KHz and the bursts of pulses having a burst repetition frequency of about 3.5 KHz, the inventive laser has an average output power about 55% greater than that of a similarly configured prior-art laser having a waveguide block of an alumina ceramic material and operated at the same wavelength and the same pulse conditions.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
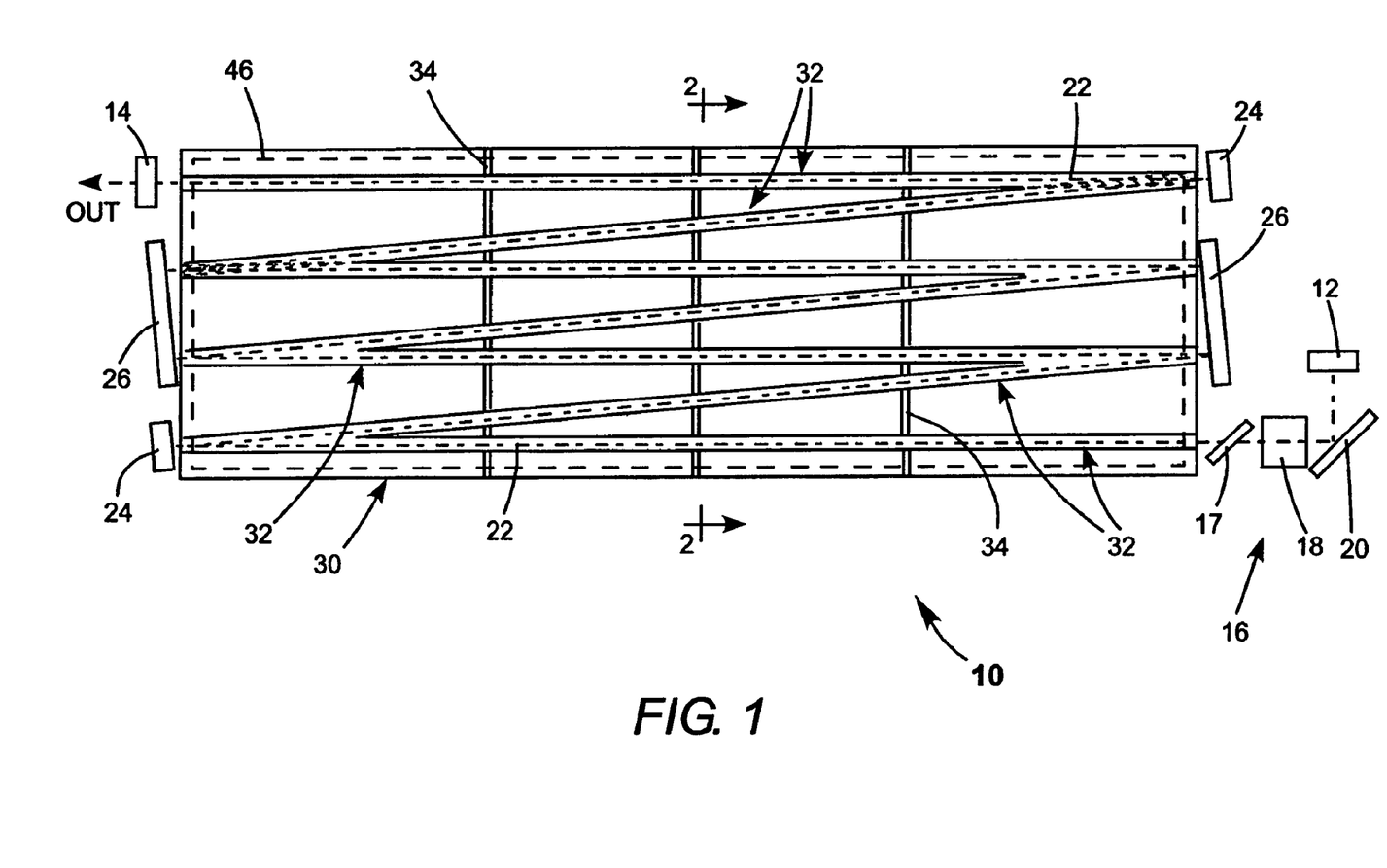
FIG. 1 is a plan view schematically illustrating a preferred embodiment of a waveguide $CO_2$ laser in accordance with the present invention having a plurality of waveguide channels machined in a BeO slab.
Figure 2:
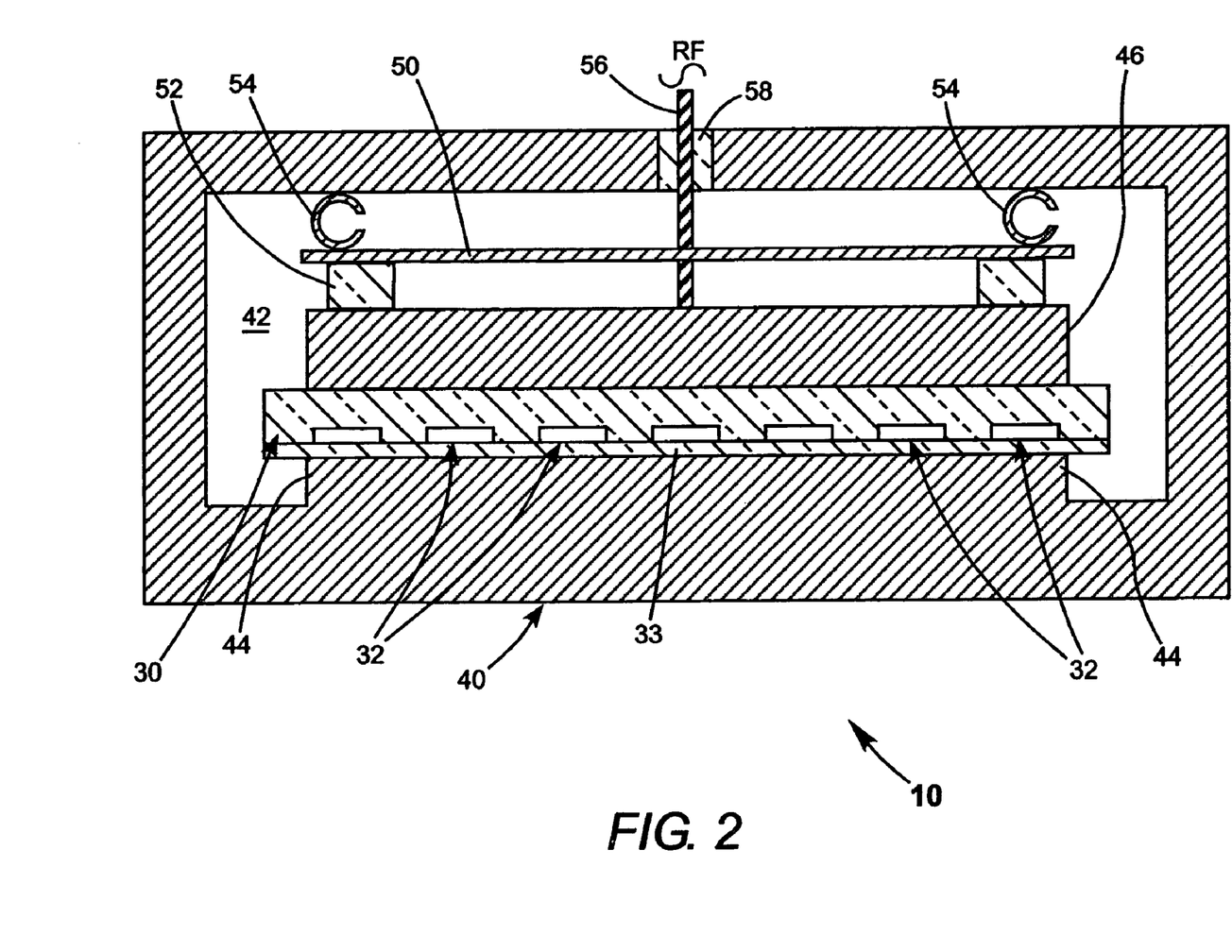
FIG. 2 is a cross-section view seen generally in the direction 2—2 of FIG. 1, schematically illustrating the details of one preferred arrangement of the BeO slab and waveguide channels of FIG. 1.

Turning now to the drawings wherein like features are designated by like reference numerals, FIG. 1 and FIG. 2 depict one preferred embodiment 10 of a Q-switched, pulsed $CO_2$ laser in accordance with the present invention. The laser is arranged to deliver laser radiation at a selected wavelength in a wavelength range between about 9.2 μm and 9.7 μm. Laser 10 includes a laser resonator terminated by a maximally reflecting mirror 12 and a partially reflecting mirror 14. Mirror 14 serves an output coupling (OC) mirror. By way of example, mirror 12 preferably has a reflectivity greater than 99%, and mirror 14 preferably has a reflectivity between about 20% and 40%. Laser 10 includes a Q-switch arrangement 16 for causing the laser to operate as a pulsed laser. Q-switch arrangement 16, here, includes a thin film polarizer (TFP) 17, a cadmium telluride (CdTe) electro-optical switch 18 and a reflective phase retarder (RPR) 20. Details of operation this and other possible Q-switch arrangements are not necessary for understanding principles of the present invention. Accordingly no such details are described or depicted herein.

Laser 10 has a resonator axis 22 folded into a zigzag form by two single fold mirrors 24 and two double fold mirrors 26. One or more of these mirrors, and mirrors 12 and 14, are provided with wavelength selective reflective coatings designed to select the laser oscillating (output) wavelength from a range of possible wavelengths in the above-discussed 9.2 µm to 9.7 µm range.

Figure 4A:
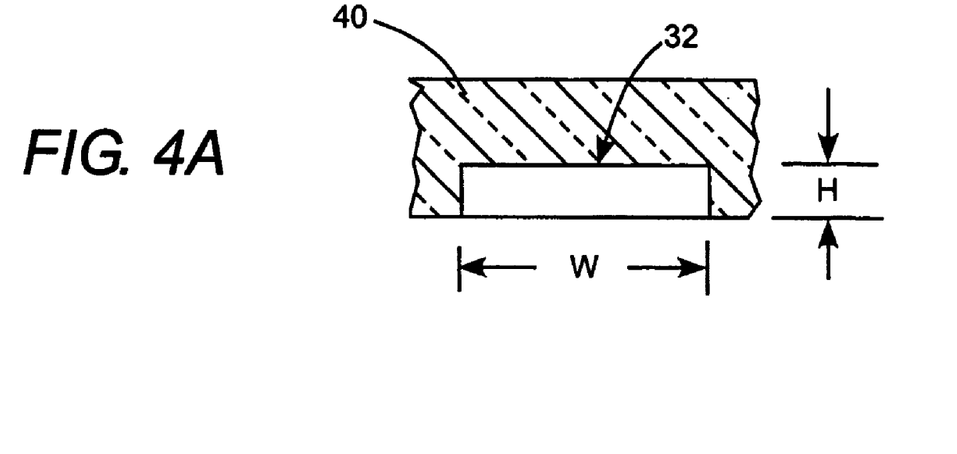
FIGS. 4A–C are fragmentary cross-section views schematically illustrating examples of preferred cross-section shapes for waveguide channels in a waveguide laser in accordance width the present invention.

Laser 10 includes a rectangular slab or block 30 of a BeO ceramic material in which are machined a plurality of waveguide channels (waveguides) 32. Waveguides 32 are arranged end-to-end in a zigzag fashion, and resonator axis 22 extends through the waveguides. One preferred cross-section shape for waveguides 32 is rectangular with waveguide having a cross-section width W (see FIG. 4A) about twice the cross-section height (waveguide depth) H. Pressure relief channels 34 extend across BeO slab 30 to connect the waveguide channels. This helps damp acoustic resonances and facilitates ignition of a discharge in a lasing gas mixture including $CO_2$ in the waveguide channels.

Referring in particular to FIG. 2, in one preferred arrangement BeO slab 30 is contained in a sealed metal housing 40, for example, an aluminum housing. Housing 40 is electrically connected to ground potential. Space 42 within the housing is filled with the lasing gas mixture, which, as noted above, also fills waveguide channels 32. BeO slab 30 is sandwiched between an internally raised portion 44 of housing 40 and an elongated rectangular electrode 46. Electrode 46 is generally referred to as the live or "hot" electrode and covers a region of BeO block 30 approximately indicated in FIG. 1 by dashed line 46. Raised portion 44 of housing 40 may be referred to as the ground electrode, which, here, being an integral part of housing 40, is electrically connected to ground. A BeO plate 33 is in contact with raised portion 44 of housing 40 and extends over BeO slab 30 such all waveguide channels 32 thereof are covered by the BeO plate and, accordingly are bounded by beryllium oxide on all sides thereof.

An LC path to ground is provided for live electrode 46 via flat-coil or serpentine inductors 50. The inductors are spaced apart from electrode 46 by ceramic spacers 52 and grounded by low inductance coil springs 54 to housing 40. RF power from a power supply (not shown) is applied to electrode 46 via a connector 56 extending through gas container 40 via an insulated feedthrough 58. The RF power causes a discharge to be generated waveguide channels 32. The gas discharge energizes the $CO_2$ lasing gas mixture causing laser radiation to circulate in the resonator along resonator axis 22. The laser radiation exits the resonator via OC mirror 14.

Figure 3:
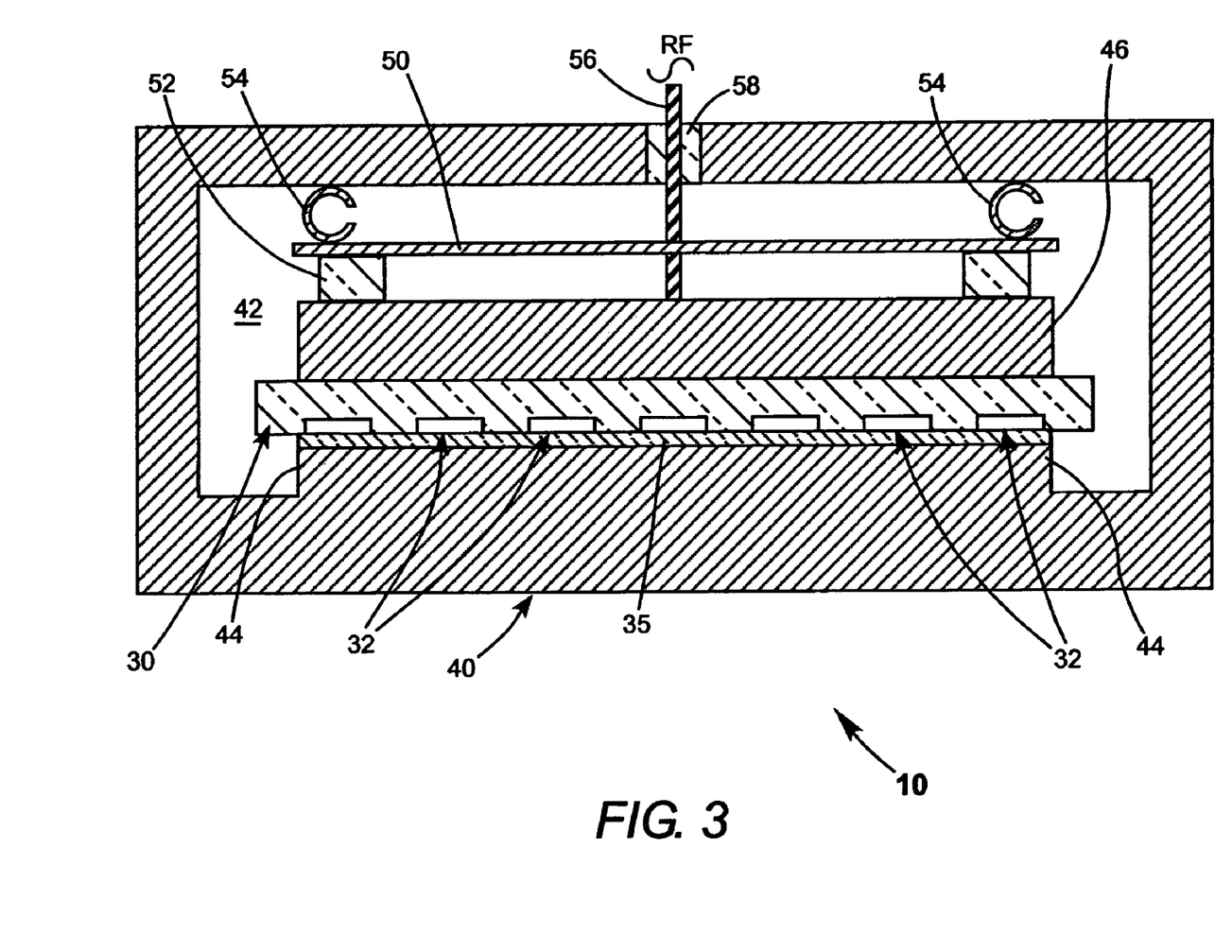
FIG. 3 is a cross-section view seen generally in the direction 2—2 of FIG. 1, schematically illustrating the details of another preferred arrangement of the BeO slab and waveguide channels of FIG. 1.

Referring to FIG. 3 another arrangement of BeO slab 30 is similar to the arrangement of FIG. 2, with an exception that BeO plate 33 is replaced by a titanium (Ti) plate 35. Electrode 44 (of aluminum) acquires an oxide layer of self limiting thickness due to exposure to air and during operation of the laser. This layer would tend to flake as a result of thermal cycling and exposure to the discharge. Titanium plate 35 also rapidly acquires an oxide layer of self-limiting thickness from exposure to air, however, titanium oxide has a sufficiently close match to that of the metallic titanium that the film does not flake off due to thermal cycling or exposure to the discharge. Such a titanium plate is often deployed on electrodes in prior-art waveguide lasers wherein waveguide channels are formed in an alumina ceramic slab.

It should be noted, here, that only sufficient details of laser 10 for understanding principles of the inventive igniter arrangement are described herein. A more detailed description of folded-waveguide lasers in general is provided in U.S. Pat. No. 6,192,061. Other relevant background can be found in U.S. Pat. No. 5,680,412; 2003/0156615 and PCT WO 01/86767. Each of the patent documents cited in this paragraph are incorporated herein by reference.

Test were performed in an example of a laser 10 wherein waveguide channels 32 each have a length of about 50.0 centimeters (cm) providing a total waveguide (energized) length of about 350 cm. Waveguide channels 32 have a width of 0.220 inches and a depth of 0.110 inches. Tests were made with the waveguide channels were covered by a BeO plate as depicted in FIG. 2 and also with the waveguide channels covered by a titanium plate as depicted in FIG. 3.

It was found for the case where the waveguide channels were covered with a BeO plate that average power output and peak-power output when operating the laser in a pulsed Q-switched mode at a wavelength of about 9.27 µm was up to about 50% higher than were the same values in a similarly configured laser wherein the waveguide slab (slab 40) ceramic material was an alumina (aluminum oxide) ceramic and the waveguide channels were covered with a titanium plate. In a differently configured laser with only three waveguide channels, it was found that 23 W average power output could be obtained when operating the inventive BeO waveguide laser at a wavelength of about 9.7 µm, while only 3 W average output power was obtained from a similarly configured laser having waveguides in an alumina ceramic slab with waveguide channels covered by a titanium plate. When operating at the more common $CO_2$ laser wavelength of 10.6 µm, the BeO material did not appear to provide any significant increase in output power compared with the output power of a similarly configured laser having waveguides in an alumina ceramic slab. Without being limited to a particular theory, it is believed that the power output increases realized in the inventive laser are achieved because the BeO waveguide channels have a significantly lower waveguide attenuation constant for wavelengths between about 9.2 and 9.7 than that for similarly configured waveguides in alumina.

Those skilled in the art will recognize that the cost of a BeO slab having waveguide channels machined therein may be as much three to five times higher that the cost of an alumina slab of the same size and having the same number and configuration of waveguide channels therein. For a Q-switch $CO_2$ laser used for sophisticated applications such as PCB drilling and machining, this cost increase can be acceptable in return for a 40 to 50% increase in average power output.

Figure 5:
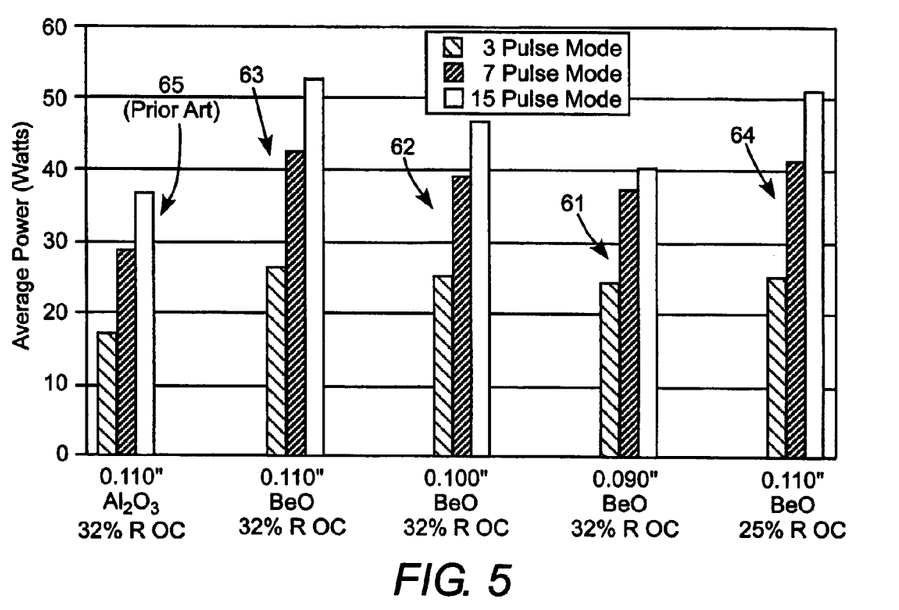
FIG. 5 is a bar chart schematically depicting average output power for various examples of the BeO waveguide laser of FIGS. 1 and 2 delivering repeated bursts of pulses in different modes, and also depicting the average output power of one example of a similarly configured prior-art alumina waveguide laser.

A detailed discussion of above-described tests of the example of the inventive laser are set forth below with reference to FIG. 5 and FIG. 6. FIG. 5 is a bar chart schematically illustrating a comparison of the average output power of a Q-switched $CO_2$ laser, operated at a lasing gas pressure between about 80 and 100 Torr, utilizing alumina and BeO ceramic dielectric waveguides, operating at 9.27 µm in a burst-mode of operation. Burst mode operation is frequently used in PCB laser-machining applications. In this burst mode of operation, bursts of pulses, here numbering 3, 7, or 15 pulses per burst were repeatedly delivered at a burst delivery rate or burst repetition frequency (BRF) of about 2.1 KHz. The pulse repetition frequency (PRF) of Q-switched pulses within a burst was about 60.0 KHz. In the BeO waveguide laser, the BeO ceramic waveguides were covered by a BeO plate as illustrated in FIG. 2.

As noted in the bar chart of FIG. 5, average power output was measured for examples of the inventive BeO waveguide laser having waveguide heights of 0.090, 0.100, and 0.110 inch, and with an output coupling (OC) mirror having a reflectivity (R) of about 32% (see bars 61, 62, and 63 respectively). Power output was also measured for an example of the inventive BeO waveguide laser having a waveguide height 0.110 inch with an OC mirror having a reflectivity of about 25% (see bars 64). These power output measurements were compared with average power output measurements of a similarly configured titanium-plate-covered alumina waveguide laser wherein the waveguide height was 0.110 inch and the reflectivity of the OC mirror was 32% (see bars 65).

The measurements indicate that, at the lasing gas pressure of between about 80 and 100 Torr, a waveguide height of 0.110 inch provided superior performance over the 0.100 and 0.090 inch waveguide height configurations of the inventive laser. Those skilled in the art will recognize, however, that optimum waveguide dimensions usually decrease with decreasing gas pressure. In this example, an OC mirror reflectivity of 32% provided slightly superior performance over an OC mirror reflectivity of 25% of the inventive BeO waveguide laser having a 0.110 inch waveguide height. In a 15 pulse burst mode, a 42% improvement in average power output over the prior-art alumina waveguide laser was obtained for the inventive BeO waveguide laser, having a 0.110" waveguide height, and a 32% reflectivity OC mirror. A 51% improvement was obtained in a 3 pulse burst mode, and a 45% improvement was obtained in a 7 pulse burst mode.

Figure 6:
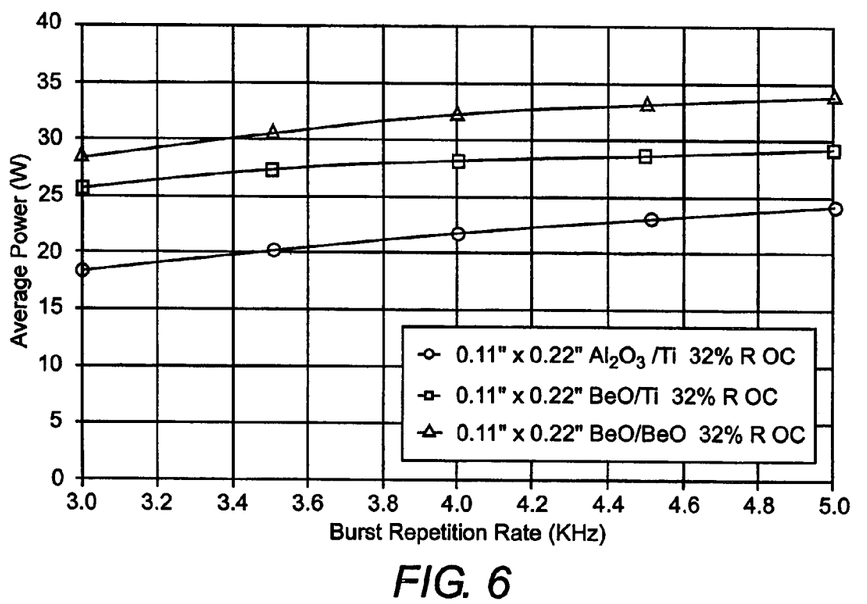
FIG. 6 is a graph schematically illustrating average output power as a function of burst repetition frequency for an example of the BeO waveguide laser configuration of FIGS. 1 and 2, and for an example of the BeO waveguide laser configuration of FIGS. 1 and 3, delivering repeated bursts of three pulses, and also illustrating average power as a function of burst repetition frequency for one example of a similarly configured and operated prior-art alumina waveguide laser.

FIG. 6 graphically depicts the average output power of the above-discussed example of the inventive BeO waveguide laser as a function of the burst repetition frequency (burst delivery rate) when operated in a 3 pulse burst mode. Triangular plot points depict the performance of an example wherein the BeO waveguide channels are covered by a BeO plate. Square plot points depict the performance of an example wherein the BeO waveguide channels are covered by a Ti plate. The average output power as a function of burst repetition frequency of a similarly configured Ti plate covered alumina waveguide laser is also depicted (circular plot points). It can be seen that for all burst rates greater than about 3.0 KHz, the average laser power output performance is significantly better for the inventive BeO waveguide laser than for the prior-art alumina waveguide laser. At all burst repetition frequencies between 3.0 and 5.0 KHz improvement in power output is about 55% to 60% for the BeO plate covered example. Other measurements indicated that comparable improvement was achievable at burst repetition frequencies as low as 1.0 KHz.

Figure 4B:
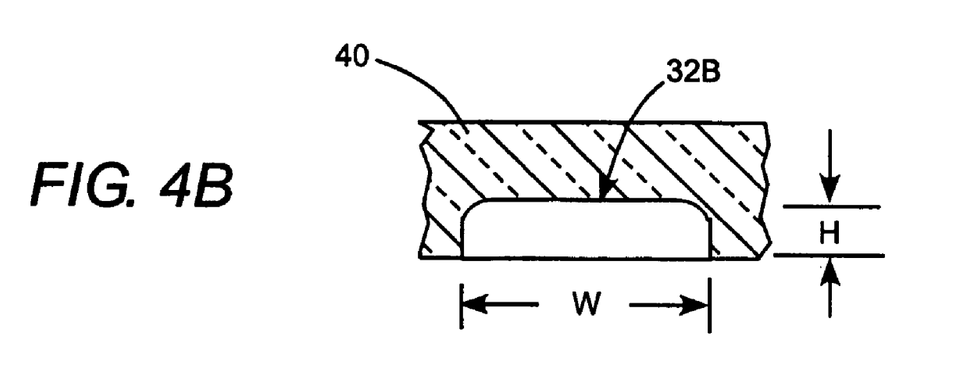
Figure 4C:
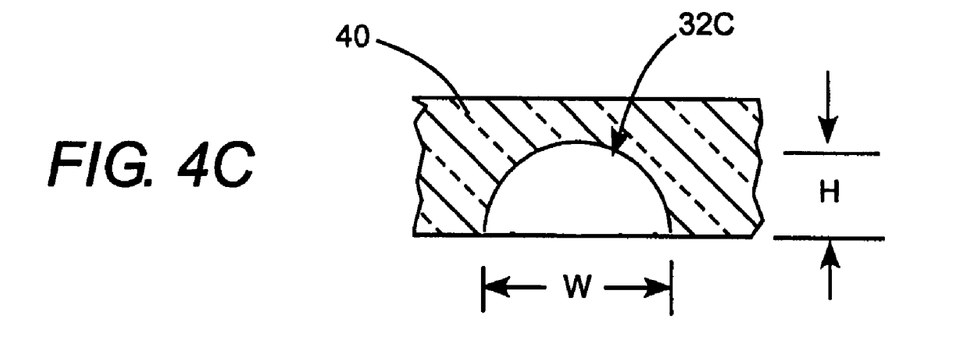

It should be noted here that while the present invention is described above in the context of a Q-switched, pulsed, folded-waveguide laser including seven waveguide channels the invention is not limited to this laser configuration. Above discussed advantages of the invention may be realized in any waveguide laser wherein there is at least one waveguide channel machined in a BeO slab or block. The waveguide channel or channels may be rectangular as exemplified above, or may be some other shape such as rectangular with rounded corners, or semicircular. By way of example, FIG. 4B shows a waveguide channel 32B having a rounded-rectangular cross-section. FIG. 4C shows a waveguide 32C having a semicircular cross-section. The laser may be operated in any pulsed mode or in a continuous wave (CW) mode. It should also be noted that while waveguide channels 30, 32, and 34 are described herein as being of uniform width, they may be tapered in width along their length such that, at a constant waveguide height, the discharge volume increases with waveguide length. Such an electrode arrangement can be used to shorten the overall length of a folded waveguide laser, and several such arrangements are described in U.S. patent application Ser. No. 10/277,272, filed Oct. 21, 2002, the complete disclosure of which is also hereby incorporated by reference. It is emphasized, however, that above-described advantages of the invention can only be expected if the laser is operated at a wavelength between about 9.2 µm and 9.7 µm.

In practice, ceramic materials used for laser applications are typically manufactured with relatively high degrees of purity. Such materials would be preferred to implement the subject invention. However, improvements in performance might be realized with a ceramic structure that was formed predominantly (rather than entirely) of BeO.

In addition, it is not necessary that the entire block 30 be formed from BeO. Rather, it is only necessary that the waveguide channels be formed from BeO. Thus, it would be possible to form the block 30 from a different material and provide a coating of BeO material in the waveguide channels.

In summary, the present invention is described herein in terms of a preferred and other embodiments. The invention is not limited, however, by the embodiments described and depicted. Rather the invention is limited only by the claims appended hereto.

What is claimed is:

1. A laser comprising:
   a waveguide block having a least one waveguide channel formed therein;
   a lasing gas including carbon dioxide within said waveguide channel; and
   a laser resonator having a resonator axis extending through said waveguide channel;
   said waveguide block being located between electrodes arranged to energize said lasing gas such that laser radiation is generated in said laser resonator; and
   wherein at least the channels of said waveguide block are formed substantially from a beryllium oxide ceramic material, and said laser radiation has a wavelength between about 9.2 and 9.7 micrometers.

2. The laser of claim 1, wherein said waveguide block includes a plurality of waveguide channels arranged end to end in a zigzag pattern and said resonator axis is folded by at least one mirror such that said resonator axis extends through said plurality of waveguide channels.

3. The laser of claim 2, wherein said waveguide block includes seven waveguide channels.

4. The laser of claim 1, wherein said laser resonator includes a Q-switch arrangement for causing said laser radiation to be generated as a train of laser pulses.

5. The laser of claim 1, wherein said lasing gas has a pressure between about 80 and 100 Torr and said waveguide channels have a depth greater than or equal to about 0.090 inch.

6. The laser of claim 1, wherein said laser radiation is generated as repeated bursts of 3 or more laser pulses.

7. The laser of claim 6, wherein said bursts of pulses are repeated at a frequency of about 1 KHz or greater.

8. The laser of claim 1, wherein said laser radiation is generated as CW radiation.

9. The laser of claim 1, wherein said at least one and any other waveguide channels are covered by a plate of a beryllium oxide material.

10. The laser of claim 1, wherein said at least one and any other waveguide channels are covered by a titanium plate.

11. The laser of claim 1, wherein said waveguide block is formed of beryllium oxide ceramic.

12. A laser comprising:

a waveguide block having a least one waveguide channel formed therein, said waveguide block being formed substantially from beryllium oxide;

a lasing gas including carbon dioxide within said waveguide channel;

said waveguide block being located between electrodes arranged to energize said lasing gas such that laser radiation is generated in said laser resonator; and a laser resonator having a resonator axis extending through said waveguide channel, said laser resonator being terminated by mirrors having wavelength selective coatings configured to cause lasing at about 9.3 microns.

* * * * *